US009084189B2

(12) United States Patent
Beale

(10) Patent No.: US 9,084,189 B2
(45) Date of Patent: Jul. 14, 2015

(54) METHOD AND APPARATUS FOR A WIRELESS COMMUNICATION UNIT OPERATING ON A VIRTUAL CARRIER

(71) Applicant: General Dynamics Broadband Inc., San Francsico, CA (US)

(72) Inventor: Martin Warwick Beale, Bristol (GB)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 17 days.

(21) Appl. No.: 13/678,804

(22) Filed: Nov. 16, 2012

(65) Prior Publication Data

US 2014/0044027 A1 Feb. 13, 2014

(30) Foreign Application Priority Data

Aug. 7, 2012 (GB) .................................. 1214136.2

(51) Int. Cl.
*H04Q 7/20* (2006.01)
*H04W 72/04* (2009.01)
*H04W 56/00* (2009.01)

(52) U.S. Cl.
CPC .................................... *H04W 56/00* (2013.01)

(58) Field of Classification Search
USPC .......... 370/255, 235, 229, 230; 455/458, 561, 455/337
See application file for complete search history.

(56) References Cited

U.S. PATENT DOCUMENTS

| 8,233,922 | B2* | 7/2012 | Petrovic et al. ............... 455/458 |
| 8,515,481 | B2* | 8/2013 | Chen et al. .................... 455/522 |
| 2011/0002281 | A1* | 1/2011 | Terry et al. .................... 370/329 |
| 2013/0003672 | A1* | 1/2013 | Dinan ........................... 370/329 |

FOREIGN PATENT DOCUMENTS

| GB | 2487782 | 8/2012 |
| GB | 2487906 | 8/2012 |
| GB | 2487909 | 8/2012 |
| GB | 2488513 | 9/2012 |

OTHER PUBLICATIONS

M.Beale, Y. Morioka. "Support of Low Complexity LTE Terminals". IEEE VTC Conference, Spring 2012, Yokohama, Japan.
M.Beale. "Future Challenges in Efficiently Supporting M2M in the LTE Standards". Internet of Things Workshop at IEEE WCNC conference, Apr. 1, 2012. Paris, France.

(Continued)

*Primary Examiner* — Curtis A Alia
*Assistant Examiner* — Sithu Ko
(74) *Attorney, Agent, or Firm* — Fitch Even Tabin & Flannery LLP

(57) ABSTRACT

A method for a low bandwidth wireless communication unit to re-synchronize to a wireless communication system employing one or more virtual carrier(s) after the wireless communication unit has lost synchronization is described. The method comprises, at the wireless communication unit: entering a sleep mode of operation following communication on a first virtual carrier; waking up from the sleep mode of operation on a default virtual carrier that is not the first virtual carrier; and acquiring synchronization information using synchronization signals that occupy subcarrier resources that overlap with the subcarrier resources occupied by the default virtual carrier to re-synchronize with the wireless communication system.

20 Claims, 9 Drawing Sheets

(56) References Cited

OTHER PUBLICATIONS

M.Beale. "Making LTE a Viable M2M Platform". Presentation at Future Network Mobile Summit., Berlin. Jul. 4-6, 2012.
Sesia, Toufik and Baker. "LTE the UMTS Long Term Evolution, 2nd edition". Published by Wiley, Feb. 2012. pp. 115-117.
C.Johnson. "Long Term Evolution in Bullets" 2nd edition. Published by CreateSpace Independent Publishing Platform. pp. 404-405.
DRX mode operation is specified in 3GPP specifications, including TS36.321 "Medium Access (MAC) Protocol Specification". This is available at: ftp://ftp.3gpp.org/Specs/latest/Rel-10/36_series/36321-a70.zip Dec. 2012.

* cited by examiner

FIG. 1 – Prior art

METHOD AND APPARATUS FOR A WIRELESS COMMUNICATION UNIT OPERATING ON A VIRTUAL CARRIER

RELATED APPLICATION(S)

This application claims the benefit of United Kingdom Application No. 1214136.2 filed Aug. 7, 2012. The content of this application is fully incorporated herein in its entirety.

DESCRIPTION

1. Field of the Invention

The field of this invention relates to a method and apparatus for a wireless communication unit, such as a user equipment (UE), operating on a virtual (communication) carrier, and in particular for UEs capable of discontinuous reception (DRX) operation when located on a virtual carrier.

2. Background of the Invention

A recent development of third generation (3G) wireless communications is the long term evolution (LTE) cellular communication standard, sometimes referred to as a $4^{th}$ generation (4G) system. 4G systems will be deployed in existing spectral allocations owned by network operators and new spectral allocations that are yet to be licensed.

LTE devices are able to operate on carriers of bandwidth up to 20 MHz. The requirement to support a bandwidth of up to 20 MHz increases device cost in comparison to lower bandwidth systems, such as the General Packet Radio Service (GPRS). The cost of supporting high bandwidth devices has led to an increasing desire to support low bandwidth (and hence low cost) LTE devices within higher bandwidth carriers. In particular, UEs and corresponding base stations (often referred to as evolved NodeBs (eNodeBs) in 3GPP parlance) have been developed that utilise low bandwidth carriers operating within the bandwidth of a higher bandwidth host carrier. An example low bandwidth carrier is a virtual carrier, operational in third or fourth generation mobile telecommunication networks within the Long-Term Evolution (LTE) standard.

Examples of devices that could beneficially use a virtual carrier include devices used for so-called machine type communication (MTC) applications, which are typified by semi-autonomous or autonomous wireless communication devices (i.e. MTC devices) communicating small amounts of data on a relatively infrequent basis. Examples of MTC devices include so-called smart meters, which, for example, may be located in a customer's house and periodically transmit information back to a central MTC server data relating to the customer's consumption of a utility such as gas, water, electricity and so on.

Whilst it can be convenient for a terminal such as an MTC type terminal to take advantage of the wide coverage area provided by a third or fourth generation mobile telecommunication network, there are at present disadvantages. Unlike a conventional third or fourth generation mobile terminal such as a smartphone, an MTC-type terminal is preferably relatively simple and inexpensive. The type of functions performed by the MTC-type terminal (e.g. collecting and reporting back data to the network) do not require particularly complex processing to be performed. In many scenarios, providing low capability terminals with a conventional high-performance LTE receiver unit capable of receiving and processing data from an LTE downlink frame across the full carrier bandwidth can be overly complex and expensive for a device which only needs to communicate small amounts of data.

There has been a particular interest in utilising LTE for machine type communications, as it is more spectrally efficient than the GPRS service and would allow network operators to reduce their operating costs. However a device utilising LTE is not as cost effective as a device utilising the 2.5G service (GPRS) due to the LTE requirement for the MTC terminal to operate in a high bandwidth carrier.

MTC application solution providers may be motivated to use LTE devices, which is in the interest of network operators, by reducing the cost of LTE devices such that they are comparable in cost terms to GPRS devices. There are numerous ways of reducing the cost of LTE devices; however one of the most promising, and potentially most effective, techniques is reducing the supported bandwidth that a device can operate on. The LTE standard is currently considering use of 'virtual carriers' in order to support low bandwidth UEs, whilst concurrently maintaining the current host carrier architecture, within which the virtual carrier operates.

Virtual carriers occupy a restricted set of symbols within the sub-frame. Specifically, virtual carriers do not occupy the symbols that are used by the host carrier to transmit the host carrier's control channels, e.g. physical downlink control channel (PDCCH), physical hybrid automatic repeat request (ARQ) indicator channel (PHICH) and physical control format indicator channel (PCFICH). Instead, virtual carriers contain narrow bandwidth VC-PDCCH, VC-PHICH and VC-PCFICH control channels: these virtual carrier control channels occupy symbols other than those occupied by the host carrier. Virtual carriers do not need to contain their own synchronization signals and UEs may use the synchronization signals transmitted by the host carrier for synchronization purposes. Additionally, virtual carriers do not need to contain a physical broadcast channel (PBCH) and UEs again may rely on the PBCH transmitted in the host carrier for the signalling of some elements of system information within a master information block. The system information for the virtual carrier may be shared with the system information for the host carrier.

Notwithstanding the above constraints, the use of virtual carriers may allow low bandwidth UEs to co-exist on the same carrier with legacy UEs. A legacy UE would generally need to decode control channel information across the entire channel bandwidth. As illustrated in FIG. 1, the LTE channel bandwidth can be up to 20 MHz, though other channel bandwidths such as 15 MHz, 10 MHz, 5 MHz, 3 MHz and 1.4 MHz are also supported. However, as mentioned, a low bandwidth UE would not be able to decode all the information from the entire channel bandwidth in the host carrier when a virtual carrier is used, as the low bandwidth UE will only have the capability to operate in a relatively narrow bandwidth, due to cost considerations associated with the hardware required to operate in a wider bandwidth.

FIG. 1 illustrates a simplified block diagram of a sub-frame of a known host legacy carrier 100 comprising a legacy control channel region 110, legacy physical broadcast channel (PBCH) 145 and synchronization signals 105, legacy data region 135, virtual carrier 130, virtual carrier data regions 120, 125 and virtual carrier control channel region 115. FIG. 1 shows the first sub-frame of a 10 msec. radio frame. The sixth sub-frame of the radio frame does not contain the PBCH; the other eight sub-frames of the radio frame contain neither synchronization signals nor the PBCH. It is necessary to have separate control channel regions for the legacy UEs and the low bandwidth devices to enable both types of UE to operate on the same carrier. Legacy UEs decode their control channels across the entire carrier bandwidth and may therefore be scheduled physical downlink shared channel (PD- SCH) resource in subcarriers outside the bandwidth of the virtual carrier. In this manner the virtual carrier is transparent to the legacy UEs that are scheduled in the host carrier.

It is possible to have multiple virtual carriers supported by a host legacy carrier. However, the virtual carriers can only exist in areas that are not occupied by the host carrier's control channels. From the viewpoint of legacy UEs that are not allocated resources in the virtual carrier, the host carrier, with the incorporated virtual carrier, is identical to the structure of a host carrier in Release 8-10 3GPP™ networks.

If there is only one virtual carrier within the host carrier, it is possible to locate that virtual carrier on the central 1.08 MHz region of the host carrier, as illustrated in this example. This is where, in Release 8-10 of 3GPP™, the physical broadcast channel (PBCH) and the primary and secondary synchronization signals (PSS and SSS) are located. Therefore, a UE situated on this virtual carrier can easily synchronize with these signals. An issue arises where, due to the number of virtual carriers, UEs have to be assigned to virtual carriers in non-central locations throughout the host carrier. If these UEs lose synchronization, they will have to re-tune to the central virtual carrier located in the central region of the host carrier in order to re-synchronize to the network. This is generally not considered to be too great a problem as synchronization would only generally be lost if the device was switched off for long periods of time.

However, the above problem can be an issue for devices utilising discontinuous reception (DRX), which is often employed in order to save power in MTC devices/applications that communicate small amounts of data on a relatively infrequent basis. In a power constrained system, for example, a UE enters a DRX phase and turns 'off' many of the UE's receive and transmit circuits. If the UE is in the DRX phase for a relatively long period of time, it will lose synchronization with the network and will have to re-synchronize using PBCH, PSS and SSS, which in this example is located on the central band of the host carrier, where the central band has a bandwidth of 1.08 MHz.

Therefore, for a host carrier comprising a plurality of virtual carriers, each virtual carrier not located on the central region of the host carrier, illustrated in this example, will have to re-tune to the central carrier band before being re-assigned to a virtual carrier somewhere else within the host carrier. This re-tuning operation will have to be performed every time a UE located on a virtual carrier in a non-central location enters a long DRX phase. In comparison to waking up on a single virtual carrier, re-assignment of a UE to a different virtual carrier on wake-up increases the time that a UE is awake during DRX operation, thereby increasing power consumption and reducing standby time.

Therefore there is a need for low bandwidth UEs located on a virtual carrier away from the central region, to be able to re-synchronize quickly and efficiently after a DRX 'sleep' phase, thereby minimising power consumption during the 'wake-up' phase of a DRX cycle.

SUMMARY OF THE INVENTION

The present invention provides communications units and methods for a low bandwidth wireless communication unit to re-synchronize to a wireless communication system as described in the accompanying claims. Specific embodiments of the invention are set forth in the dependent claims. These and other aspects of the invention will be apparent from and elucidated with reference to the embodiments described hereinafter.

DETAILED DESCRIPTION

Figure 1:
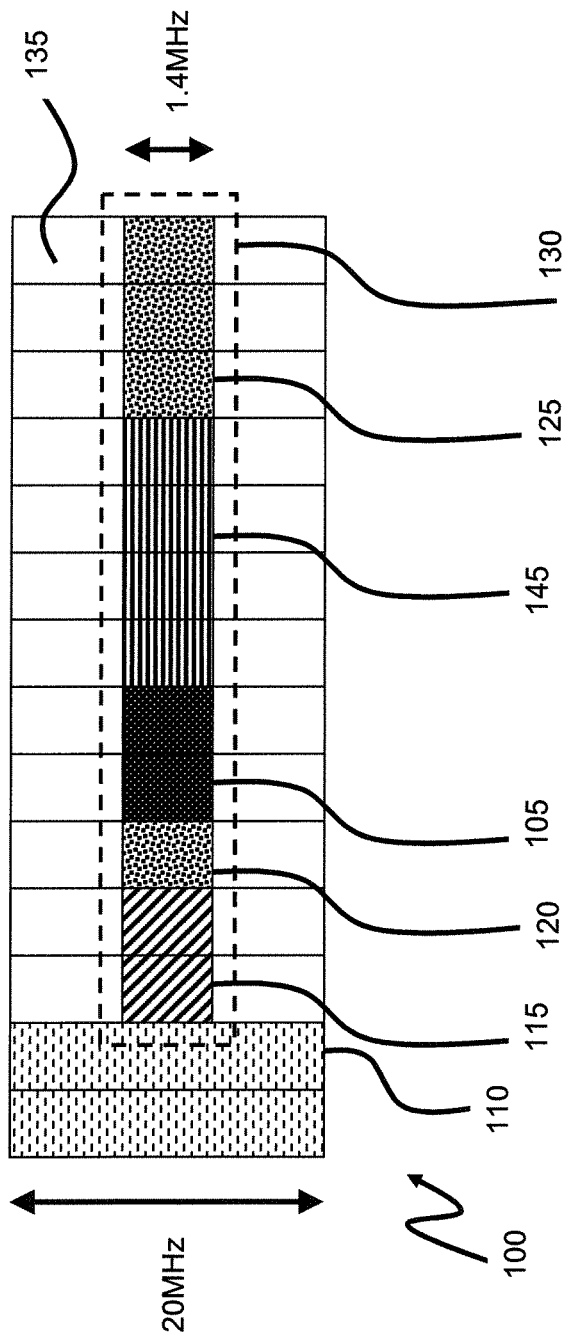
FIG. 1 illustrates an example of a simplified diagram of a virtual carrier located within a host carrier.

Examples of the invention provide communication units, associated integrated circuits and methods for a low bandwidth wireless communication unit to re-synchronize to a wireless communication system. In particular, a method for a low bandwidth wireless communication unit to re-synchronize to a wireless communication system employing one or more virtual carrier(s) after the wireless communication unit has lost synchronization comprises, at the wireless communication unit, entering a sleep mode of operation following communication on a first virtual carrier; and waking up from the sleep mode of operation on a default virtual carrier that is not the first virtual carrier. The method further comprises acquiring synchronization information using synchronization signals that occupy subcarrier resources that overlap with the subcarrier resources occupied by the default virtual carrier to re-synchronize with the wireless communication system. In this manner, a low bandwidth wireless communication unit (such as a user equipment (UE)), which is located on a virtual carrier away from the central region, is able to re-synchronize quickly and efficiently after a DRX 'sleep' phase, thereby minimising power consumption during the 'wake-up' phase of a DRX cycle.

In some examples, the method may further comprise receiving a paging signal on the default virtual carrier and re-tuning to the first virtual carrier or a second virtual carrier in response thereto. In this manner, existing paging formats and paging signals may be utilised. In some examples, the method may further comprise additionally receiving a paging signal on the first virtual carrier and re-tuning to the second virtual carrier in response thereto. In this manner, the wireless communication unit may be able to receive the paging signal from either the first virtual carrier if it has not yet lost synchronization or the default virtual carrier if it has lost synchronization. In some examples, the method may further comprise returning to a sleep mode of operation on the default virtual carrier if no paging signal for the wireless communication unit is received, to enable the wireless communication unit to be ready to wake up at the next paging instant.

In some examples, at least one of the first virtual carrier and the default virtual carrier may be located within a host carrier, for example where the default virtual carrier may be substantially centrally located in a frequency band of the host carrier. In this manner, the method may be employed in an existing host carrier and the extent of any re-tuning is minimised with the default virtual carrier being substantially centrally located in a frequency band of the host carrier.

In some examples, the synchronization information may comprise at least one of a primary synchronization signal (PSS) or a secondary synchronization signal (SSS). In this manner, existing synchronization signals may be used. In some examples, entering a sleep mode of operation may comprise entering a discontinuous receive (DRX) mode of operation.

In some examples, the method may further comprise determining a time period of sleep mode operation and in response to the determined time period exceeding a threshold waking up from the sleep mode of operation on the default virtual carrier that is not the first virtual carrier. In this manner, the wireless communication unit may regularly check wake up from the sleep mode to check whether any communications are to be received. In some examples, the time period threshold may equate to a time period that is sufficiently large that the wireless communication unit synchronizes using reference symbols and synchronisation signals. In this manner, the wireless communication unit may acquire synchronization information using synchronization signals that occupy subcarrier resources that overlap with the subcarrier resources occupied by the default virtual carrier when it would have lost synchronization with the first virtual carrier.

Examples of the invention further provide a low bandwidth wireless communication unit comprising a control processor arranged to enter a sleep mode of operation following communication on a first virtual carrier of a wireless communication system employing one or more virtual carrier(s); and a receiver operably coupled to the control processor and arranged to wake up the low bandwidth wireless communication unit from the sleep mode of operation on a default virtual carrier that is not the first virtual carrier. The control processor is further arranged to acquire synchronization information using synchronization signals that occupy subcarrier resources that overlap with the subcarrier resources occupied by the default virtual carrier to re-synchronize with the wireless communication system.

Examples of the invention further provide an integrated circuit for a low bandwidth wireless communication unit comprising a control processor arranged to enter a sleep mode of operation following communication on a first virtual carrier of a wireless communication system employing one or more virtual carrier(s) and wake up the low bandwidth wireless communication unit from the sleep mode of operation on a default virtual carrier that is not the first virtual carrier. The control processor is further arranged to acquire synchronization information using synchronization signals that occupy subcarrier resources that overlap with the subcarrier resources occupied by the default virtual carrier to re-synchronize with the wireless communication system.

Examples of the invention further provide a method for a base station to enable a low bandwidth wireless communication unit to re-synchronize to a wireless communication system employing one or more virtual carrier(s) after the wireless communication unit has lost synchronization. The method comprises, at the base station: receiving a paging request for a wireless communication unit; determining whether the paging request relates to a low bandwidth wireless communication unit that is in a sleep mode; and paging the low bandwidth wireless communication unit on a default virtual carrier that is not a virtual carrier on which the low bandwidth wireless communication unit entered the sleep mode.

Examples of the invention further provide a base station for supporting a low bandwidth wireless communication unit in a wireless communication system employing one or more virtual carrier(s), the base station comprising: a receiver arranged to receive a paging request for a wireless communication unit; a control processor arranged to determine whether the paging request relates to a low bandwidth wireless communication unit that is in a sleep mode; and a transmitter arranged to page the low bandwidth wireless communication unit on a default virtual carrier that is not a virtual carrier on which the low bandwidth wireless communication unit entered the sleep mode.

Examples of the invention further provide an integrated circuit for a base station for supporting a low bandwidth wireless communication unit in a wireless communication system employing one or more virtual carrier(s). The integrated circuit comprises: a control processor arranged to receive a paging request for a wireless communication unit and determine whether the paging request relates to a low bandwidth wireless communication unit that is in a sleep mode; wherein the control processor is further arranged to page the low bandwidth wireless communication unit on a default virtual carrier that is not a virtual carrier on which the low bandwidth wireless communication unit entered the sleep mode.

Figure 2:
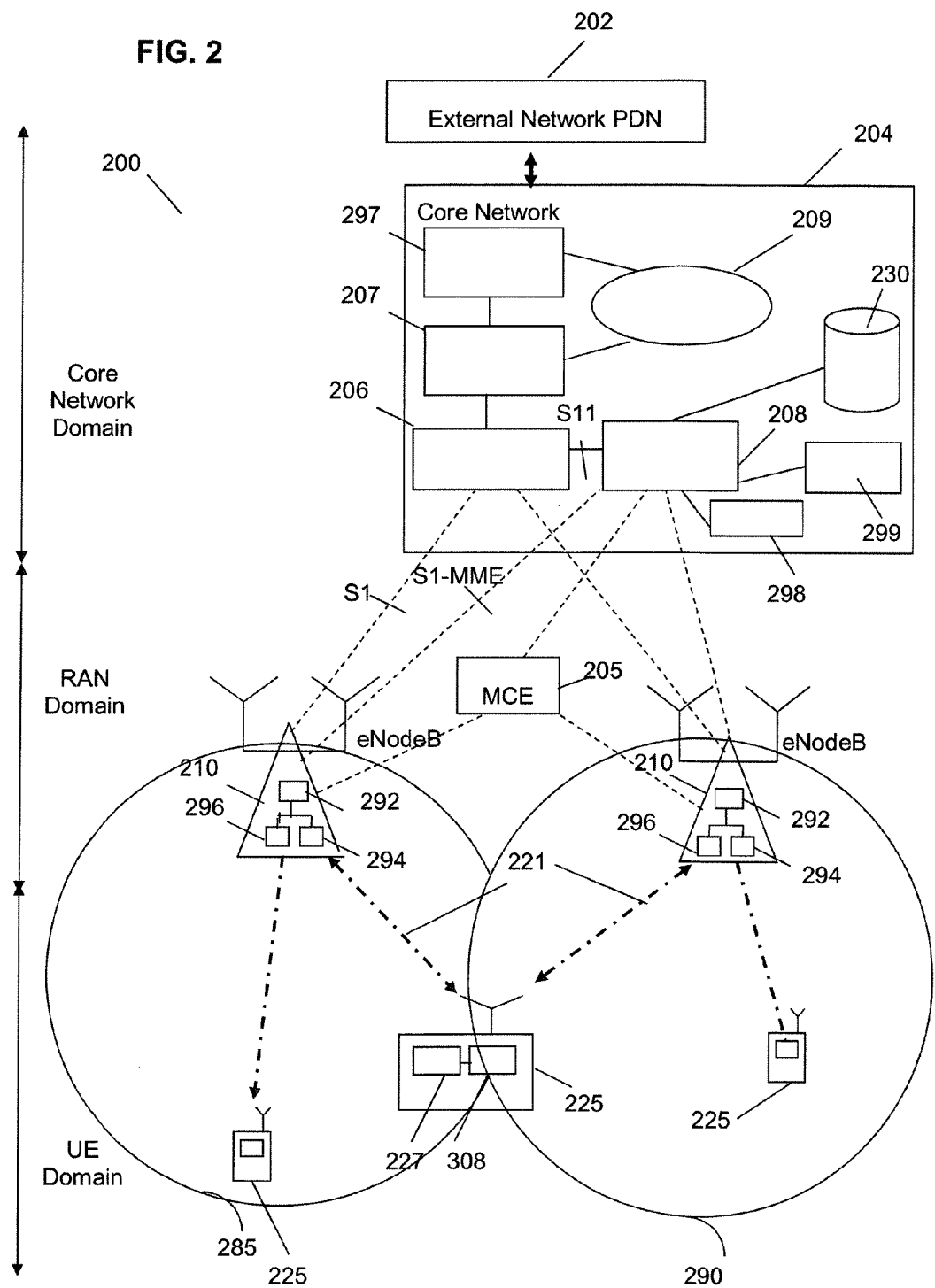
FIG. 2 illustrates a 3GPP™ long term evolution (LTE) cellular communication system adapted in accordance with some example embodiments of the present invention.

Referring now to FIG. 2, a wireless communication system 200 is shown in outline, in accordance with one example embodiment of the invention. In this example embodiment, the wireless communication system 200 is compliant with, and contains network elements capable of operating over, a universal mobile telecommunication system (UMTS™) air-interface. In particular, the embodiment relates to a system's architecture for an Evolved-UMTS Terrestrial Radio Access Network (E-UTRAN) wireless communication system, which is currently under discussion in the third Generation Partnership Project (3GPP™) specification for long term evolution (LTE), based around OFDMA (Orthogonal Frequency Division Multiple Access) in the downlink (DL) and SC-FDMA (Single Carrier Frequency Division Multiple Access) in the uplink (UL), as described in the 3GPP™ TS 36.xxx series of specifications. Within LTE, both time division duplex (TDD) and frequency division duplex (FDD) modes are defined.

The wireless communication system 200 architecture consists of radio access network (RAN) and core network (CN) elements 204, with the core network elements 204 being coupled to external networks 202 (named Packet Data Networks (PDNs)), such as the Internet or a corporate network. The CN elements 204 comprise a packet data network gateway (P-GW) 207. In order to serve up local content, the P-GW may be coupled to a content provider. The P-GW 207 may be further coupled to a policy control and rules function entity (PCRF) 297 and a Gateway 206.

The PCRF 297 is operable to control policy control decision making, as well as for controlling the flow-based charging functionalities in a policy control enforcement function PCEF (not shown) that may reside in the P-GW 207. The PCRF 297 may further provide a quality of service (QoS) authorisation class identifier and bit rate information that dictates how a certain data flow will be treated in the PCEF, and ensures that this is in accordance with a UE's 225 subscription profile.

In example embodiments, the Gateway 206 may be a Multimedia Broadcast and Multicast Service (MBMS) or a Serving Gateway (S-GW). The Gateway 206 is coupled to a mobility management entity MME 208 via an S11 interface. The MME 208 is operable to manage session control of Gateway bearers and is operably coupled to a home subscriber server (HSS) database 230 that is arranged to store subscriber communication unit 225 (user equipment (UE)) related information. As illustrated, the MME 208 also has a direct connection to each eNodeB 210, via an S1-MME interface, which is used when receiving PAGING REQUESTs across the S1 interface, as described later with respect to FIG. 9.

The HSS database 230 may store UE subscription data such as QoS profiles and any access restrictions for roaming. The HSS database 230 may also store information relating to the P-GW 207 to which a UE 225 can connect. For example, this data may be in the form of an access point name (APN) or a packet data network (PDN) address. In addition, the HSS database 230 may hold dynamic information relating to the identity of the MME 208 to which a UE 225 is currently connected or registered.

The MME 208 may be further operable to control protocols running between the user equipment (UE) 225 and the CN elements 204, which are commonly known as Non-Access Stratum (NAS) protocols. The MME 208 may support at least the following functions that can be classified as: functions relating to bearer management (which may include the establishment, maintenance and release of bearers), functions relating to connection management (which may include the establishment of the connection and security between the network and the UE 225) and functions relating to inter-working with other networks (which may include the handover of voice calls to legacy networks). The Gateway 206 predominantly acts as a mobility anchor point and is capable of providing internet protocol (IP) multicast distribution of user plane data to eNodeBs 210. The Gateway 206 may receive content via the P-GW 207, from one or more content providers 209 or via the external PDN 202. The MME 208 may be further coupled to an evolved serving mobile location center (E-SMLC) 298 and a gateway mobile location center (GMLC) 299.

The E-SMLC 298 is operable to manage the overall coordination and scheduling of resources required to find the location of the UE that is attached to the RAN, in this example embodiment the E-UTRAN. The GMLC 299 contains functionalities required to support location services (LCS). After performing an authorisation, it sends positioning requests to the MME 208 and receives final location estimates.

The P-GW 207 is operable to determine IP address allocation for a UE 225, as well as QoS enforcement and flow-based charging according to rules received from the PCRF 297. The P-GW 207 is further operable to control the filtering of downlink user IP packets into different QoS-based bearers (not shown). The P-GW 207 may also serve as a mobility anchor for inter-working with non-3GPP technologies such as CDMA2000 and WiMAX networks.

The Gateway 206, as discussed above, may comprise an MBMS gateway or an S-GW. If Gateway 206 comprises an MBMS gateway, an MBMS co-ordination entity (MCE) 205 may be required that would reside in the E-UTRAN between the MME 208 and the eNodeBs 210. The MCE 205 manages the layer-2 configurations and the use of the radio resources for broadcast transmission. Thus, the MCE 205 is a radio access network (RAN) domain element and can be either a separate entity (as shown) or located at the eNodeB 210. For user plane (UP) data, the BM-SC 207 is directly coupled to the eNodeBs 210 via an M1 interface.

If the Gateway 206 comprises an S-GW, the MCE 205 may not be required, and the eNodeBs 210 would be connected to the S-GW 206 and the MME 208 directly. In this case, all UE packets would be transferred through the S-GW 206, which may serve as a local mobility anchor for the data bearers when a UE 225 moves between eNodeBs 210. The S-GW 206 is also capable of retaining information about the bearers when the UE 225 is in an idle state (known as EPS connection management IDLE), and temporarily buffers downlink data while the MME 208 initiates paging of the UE 225 to re-establish the bearers. In addition, the S-GW 206 may perform some administrative functions in the visited network, such as collecting information for charging (i.e. the volume of data sent or received from the UE 225). The S-GW 206 may further serve as a mobility anchor for inter-working with other 3GPP™ technologies such as GPRS™ and UMTST™.

As illustrated, the CN 204 is operably connected to two eNodeBs 210, with their respective coverage zones or cells 285, 290 and a plurality of UEs 225 receiving transmissions from the CN 204 via the eNodeBs 210. In accordance with example embodiments of the present invention, at least one eNodeB 210 and at least one UE 225 (amongst other elements) have been adapted to support the concepts hereinafter described.

The main component of the RAN is an eNodeB (an evolved NodeB) 210, which performs many standard base station functions and is connected to the CN 204 via an S1 interface and to the UEs 225 via a Uu interface. A wireless communication system will typically have a large number of such infrastructure elements where, for clarity purposes, only a limited number are shown in FIG. 2. The eNodeBs 210 control and manage the radio resource related functions for a plurality of wireless subscriber communication units/terminals (or user equipment (UE) 225 in UMTS™ nomenclature). Each of the UEs 225 comprise a transceiver unit 227 operably coupled to signal processing logic 308 (with one UE illustrated in such detail for clarity purposes only). The system comprises many other UEs 225 and eNodeBs 210, which for clarity purposes are not shown. As illustrated, each eNodeB 210 comprises one or more wireless transceiver (transmitter and/or receiver) unit(s) 294 that is/are operably coupled to a control processor 296 and memory 292 for storing, inter alia, information relating to UEs and UE capabilities, for example whether the UE is capable of operating as a low bandwidth UE. The base station (for example eNodeB 210) is arranged to support a low bandwidth wireless communication unit 225 in a wireless communication system employing one or more virtual carrier(s). The eNodeB 210 comprises a receiver (in wireless transceiver unit(s) 294) arranged to receive a paging request for a wireless communication unit 225; the control processor 296 being arranged to determine whether the paging request relates to a low bandwidth wireless communication unit that is in a sleep mode; and a transmitter (in wireless transceiver unit(s) 294) arranged to page the low bandwidth wireless communication unit on a default virtual carrier that is not a virtual carrier on which the low bandwidth wireless communication unit entered the sleep mode.

In some examples, the control processor 296 may be located on an integrated circuit (not shown).

Thus, in example embodiments of the invention, the control processor 296 may be arranged to receive a paging request message from, say, a mobility management entity MME over, say, an S1 interface. The control processor 296 may then determine whether the UE to be paged is a full bandwidth legacy UE or a low bandwidth UE and wait until a suitable time to forward a paging message to the UE. In example embodiments where the UE is a low bandwidth UE, the control processor 296 of the eNodeB 210 pages the low bandwidth UE on a primary virtual carrier, using say a virtual carrier physical downlink control channel (VC-PDCCH) scrambled with a paging-radio network temporary identifier (P-RNTI) and the paging control channel (PCCH) mapped to the paging channel (PCH). The location or existence of the primary virtual carrier may be indicated using the physical broadcast channel (PBCH) of the host carrier. In 3GPP™ LTE it is known that the PBCH does not have much spare resource (e.g. spare bits). Hence, in some examples, a PBCH (or similar) may be employed to indicate one virtual carrier (e.g. the primary virtual carrier). In some examples, the existence and location of other virtual carriers, such as a secondary virtual carrier, may be indicated using the primary virtual carrier.

The control processor 296 of the eNodeB 210 then maps the PCH to the physical downlink shared channel (PDSCH). In the case of the virtual carrier, the PCH may specifically be mapped to virtual carrier (VC-PDSCH) resources. When the low bandwidth UE initially connects to the system, or upon a reconfiguration of the system, the control processor 296 of the eNodeB 210 indicates to the UE, say in an RRC connection or RRC reconfiguration message, the working virtual carrier that it should operate on. When the working virtual carrier for a UE is different to the primary virtual carrier, the eNodeB 210 completes the connection procedure on the relevant working virtual carrier for the UE.

Clearly, the various components within the eNodeB 210 can be realized in discrete or integrated component form, with an ultimate structure therefore being an application-specific or design selection.

In one example, the UE 225 is a low bandwidth UE that enters and leaves a discontinuous receive (DRX) state, according to an example embodiment of this invention. Initially, the low bandwidth UE is camped on a working virtual carrier supported by the eNodeB 210. After the expiry of, say, an inactivity timer, the low bandwidth UE enters a 'sleep' DRX phase, and commences a low power mode of operation. Notably, the signal processing logic 308 of the low bandwidth UE 225 'wakes-up' on the primary virtual carrier. When the UE sleeps for a sufficiently long time, it will need to re-synchronize to the network. For example, if the time period that it sleeps exceeds a threshold that is sufficiently large, the wireless communication unit re-synchronizes using synchronisation signals as well as reference symbols (where a reference symbol may consist of a single subcarrier in a single OFDM symbol with a known amplitude and phase. Within this description, the term 'reference symbol' may also be referred to as a reference signal and as such the two terms may be used interchangeably). In contrast, if the UE only sleeps for a few frames, the UE's clocks will not have drifted enough for re-synchronization using the primary synchronization signal (PSS)/secondary synchronization signal (SSS) to be necessary, as the UE will probably already be sufficiently time synchronized to regain accurate synchronization using just the reference symbols within the sub-frame. The low bandwidth UE is synchronized with the network once it has acquired the PSS and the SSS. Thus, examples of the invention are particularly advantageous when there are long DRX sleep phases (often found in delay-tolerant MTC applications that are operating on very power-constrained devices).

Figure 3:
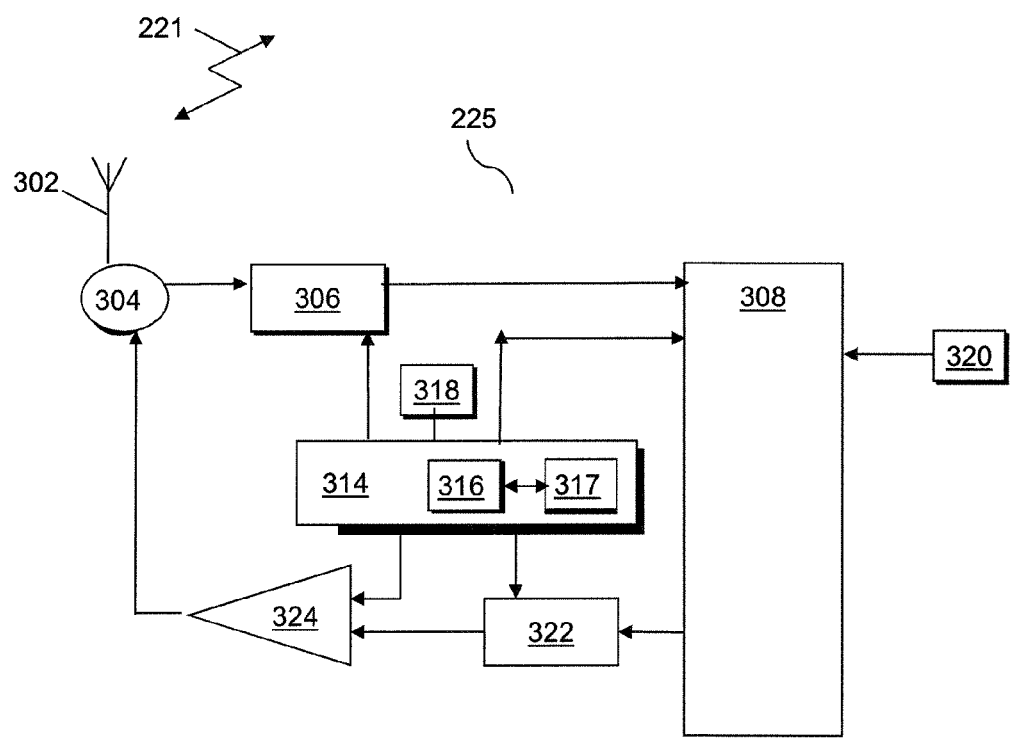
FIG. 3 illustrates an example block diagram of a wireless communication unit, such as a 3GPP™ LTE user equipment adapted in accordance with some example embodiments of the present invention.

Referring now to FIG. 3, a block diagram of a wireless communication unit, adapted in accordance with some example embodiments of the invention, is shown. In practice, purely for the purposes of explaining embodiments of the invention, the wireless communication unit is described in terms of a wireless subscriber communication unit, such as a UE 225. The wireless communication unit 225 contains an antenna 302 coupled to an antenna switch or duplexer 304 that provides isolation between receive and transmit chains within the wireless communication unit 225. One or more receiver chains, as known in the art, include receiver front-end circuitry 306 (effectively providing reception, filtering and intermediate or base-band frequency conversion). The receiver front-end circuitry 306 is coupled to a signal processing logic 308 (generally realized by a digital signal processor (DSP)). A skilled artisan will appreciate that the level of integration of receiver circuits or components may be, in some instances, implementation-dependent.

The controller 314 maintains overall operational control of the wireless communication unit 225. The controller 314 is also coupled to the receiver front-end circuitry 306 and the signal processing logic 308. In some examples, the controller 314 is also coupled to a buffer module 317 and a memory device 316 that selectively stores operating regimes, such as decoding/encoding functions, synchronization patterns, code sequences, and the like. A timer 318 is operably coupled to the controller 314 to control the timing of operations (transmission or reception of time-dependent signals) within the wireless communication unit 225.

As regards the transmit chain, this essentially includes an input module 320, coupled in series through transmitter/modulation circuitry 322 and a power amplifier 324 to the antenna 302, antenna array, or plurality of antennas. The transmitter/modulation circuitry 322 and the power amplifier 324 are operationally responsive to the controller 314.

In some examples, the signal processing logic 308 may be located on an integrated circuit (not shown). The signal processing logic 308 in the transmit chain may be implemented as distinct from the signal processor in the receive chain. Alternatively, a single processor may be used to implement a processing of both transmit and receive signals, as shown in FIG. 3. Clearly, the various components within the wireless communication unit 225 can be realized in discrete or integrated component form, with an ultimate structure therefore being an application-specific or design selection.

Figure 4:
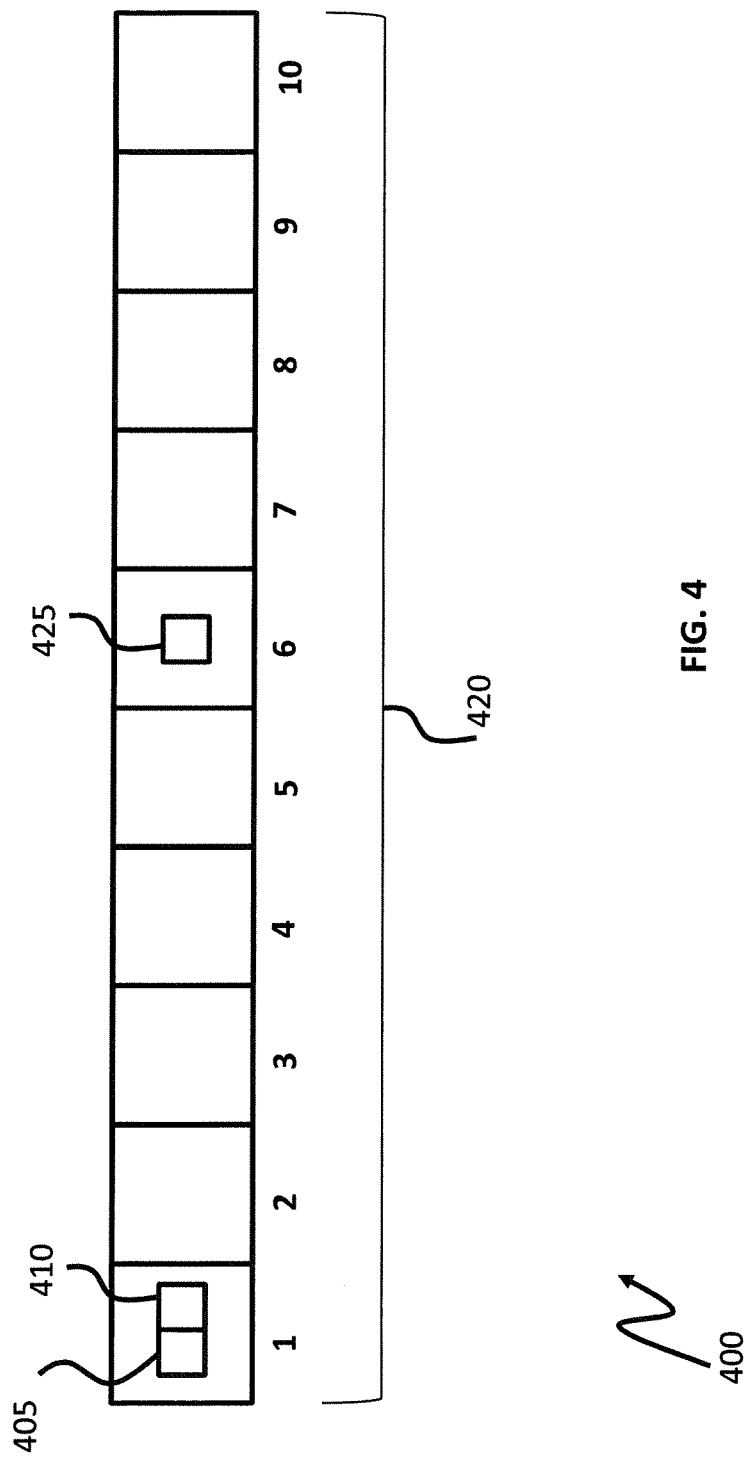
FIG. 4 illustrates a schematic diagram of an example of a conventional LTE downlink radio frame.

Referring now to FIG. 4 a schematic diagram illustrating an OFDM based LTE downlink radio frame 400 is illustrated. The LTE downlink radio frame is transmitted from an LTE base station (known as an enhanced Node B) and is of 10 msec. in length. The downlink radio frame 420 comprises ten sub-frames, each sub-frame being of 1 msec. in length. A first instance of the primary synchronization signal (PSS) and a secondary synchronization signal (SSS) is transmitted in the first 405 sub-frame of the LTE frame and a second instance of the PSS and SSS is transmitted in the sixth 425 sub-frame of the LTE frame. A physical broadcast channel (PBCH) 410 is also transmitted in the first sub-frame of the LTE frame.

Figure 5:
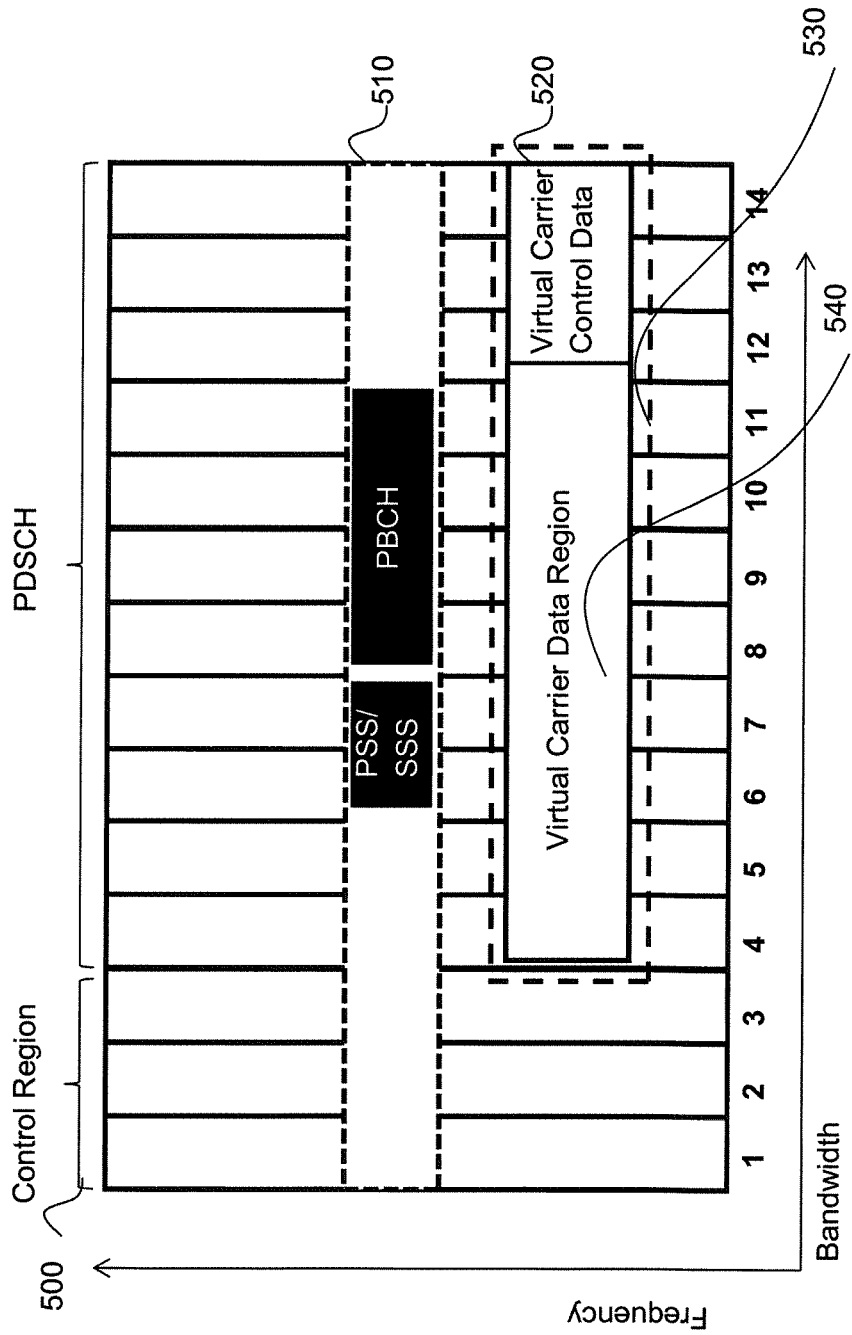
FIG. 5 illustrates a schematic diagram of the first sub-frame of an LTE downlink radio frame in which a virtual carrier has been inserted according to an example embodiment of the invention.

FIG. 5 shows a schematic diagram illustrating an LTE downlink sub-frame that includes a virtual carrier inserted in a host carrier in accordance with example embodiments of the invention. In keeping with a conventional LTE downlink sub-frame, the first 'n' symbols (where 'n' is three in FIG. 5) form the control region 500, which is reserved for the transmission of downlink control data such as data transmitted on the PDCCH. However, as can be seen from FIG. 5, outside of the control region 500 the LTE downlink sub-frame includes a group of resource elements below the central band 510 that is allocated to function as a virtual carrier 530. As will become clear, the virtual carrier 530 is adapted such that data transmitted on the virtual carrier 530 can be treated as logically distinct from the data transmitted in the remaining parts of the host carrier, and can thus and advantageously be decoded without first decoding all the control data from the control region 500. Although FIG. 5 shows the virtual carrier 530 occupying frequency resources below the center band, in other examples the virtual carrier 530 may be arranged to either occupy frequency resources above the center band or frequency resources, including the center band. If the virtual carrier 530 is configured to overlap any resources used by the PSS, SSS or PBCH of the host carrier, or any other signal transmitted by the host carrier that a mobile terminal operating on the host carrier would require for correct operation and expect to find in a known pre-determined location, the signals on the virtual carrier 530 can be arranged such that these aspects of the host carrier signal are maintained. The virtual carrier 530 is shown in FIG. 5 to comprise both a virtual carrier control data region 520 and a virtual carrier data region 540. The virtual carrier control data region 520 may be used to transmit control channels within the virtual carrier, such as a virtual carrier physical downlink control channel (VC-PDCCH) etc. The virtual carrier data region 540 may be used to transmit data-bearing channels, such as a virtual carrier physical downlink shared channel (VC-PDSCH).

As illustrated in FIG. 5, data transmitted on the virtual carrier 530 is transmitted across a limited bandwidth. In some examples, the virtual carrier may be arranged to encompass any suitable bandwidth, which in most examples is arranged to be smaller than that of the host carrier. In the example shown in FIG. 5 the virtual carrier 530 is transmitted across a bandwidth comprising 12 blocks of 12 sub-carriers (i.e. 144 sub-carriers), which is equivalent to a 2.16 MHz transmission bandwidth. Accordingly, a terminal receiving data transmitted on the virtual carrier need only be equipped with a receiver that is capable of receiving and processing data transmitted over a bandwidth of 2.16 MHz. This enables low capability terminals (for example MTC type terminals) to be provided with simplified receiver units and yet still be able to operate within an OFDM type communication network, which, as explained previously, conventionally requires terminals to be equipped with receivers capable of receiving and processing an OFDM signal across the entire bandwidth of the signal. In other examples, the virtual carrier may occupy, say, six blocks of twelve subcarriers, leading to a virtual carrier operating in 72 subcarriers, which is equivalent to operation in a 1.08 MHz transmission bandwidth.

As can be seen in FIG. 5, the final symbols of the virtual carrier 530 can be reserved as a virtual carrier control region 520, which is allocated for the transmission of hybrid ARQ acknowledgements via a VC-PHICH, PDSCH allocations via a VC-PDCCH, the number of symbols occupied by the virtual carrier control region via a VC-PCFICH, and the number of symbols occupied by the host control channel region via a VC-PCFICH2. In some examples the number of symbols comprising the virtual carrier control region 520 may be fixed, for example three symbols. In other examples the virtual carrier control region 520 may vary in size, for example between one and three symbols.

In some examples, the virtual carrier control region 520 may be located at any suitable position within the virtual carrier 530, for example in the first few symbols of the virtual carrier 530. In the example of FIG. 5, this may mean locating the virtual carrier control region 520 on the fourth, fifth and sixth symbols. However, fixing the position of the virtual carrier control region 520 in the final symbols of the sub-frame may provide an advantage as the position of the virtual carrier control region 520 need not vary, even if the number of symbols of the host carrier control region varies. This simplifies the processing undertaken by wireless subscriber units, such as UEs, receiving data on the virtual carrier because there is no need for them to determine the position of the virtual carrier control region every sub-frame as it is known that it will always be positioned in the final symbols of the sub-frame. Furthermore, some virtual carrier control channels (e.g. the VC-PHICH, VC-PDCCH and VC-PCFICH) may occupy the first few symbols of the virtual carrier, whereas other virtual carrier control channels, e.g. the VC-PCFICH2, may occupy, say, the final symbols of the virtual carrier.

In some examples the virtual carrier may be located within the center frequency band 510 of the downlink sub-frame. In this manner, a reduction in host carrier PDSCH resources caused by the insertion of one or more virtual carriers may be minimised, since the resources occupied by the PSS/SSS (two symbols) and PBCH (four symbols) would be contained within the virtual carrier region and not the host carrier PDSCH region. Therefore, depending on, for example, the expected virtual carrier throughput, the location of a primary virtual carrier can be appropriately chosen to either exist inside or outside the center band according to whether the host or primary virtual carrier is chosen to bear the overhead of the PSS, SSS and PBCH. In some examples, the location or existence of the primary virtual carrier may be indicated using the PBCH of the host carrier.

Figure 6:
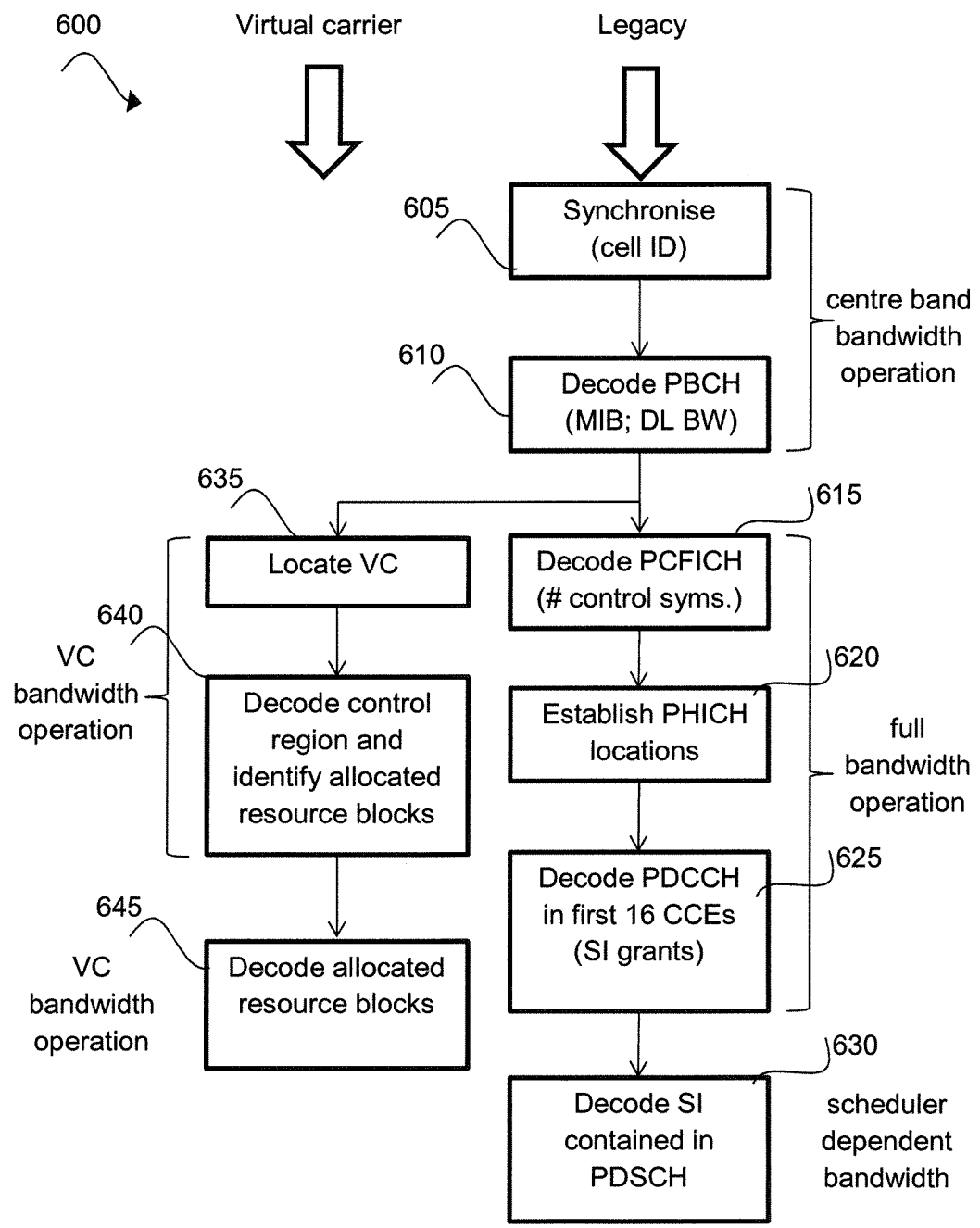
FIG. 6 illustrates a schematic diagram of an adapted LTE 'camp-on' procedure for camping on to a virtual carrier.

Referring now to FIG. 6, a flowchart 600 of example procedures for both a low bandwidth UE to camp-on to a virtual carrier and for a conventional legacy UE to camp-on to a host carrier is shown in outline.

In a conventional legacy camp-on procedure, the full or low bandwidth wireless subscriber unit, such as a full or low bandwidth UE, first synchronizes with the base station, such as an eNodeB, as shown in 605. The full or low bandwidth UE uses the PSS and SSS located, for example, in a generally central frequency region of the host carrier, e.g. the central region 510 of the host carrier of FIG. 5, as mentioned above, to synchronize with the network, as shown in 605. In one example, the low bandwidth UE and legacy full bandwidth UE detect the PSS and SSS in the center band and from these signals determine the cyclic prefix duration and the Cell ID. In LTE the PSS and SSS are only transmitted in the first and sixth sub-frames of each radio frame. In a different system, for example a non-LTE system, the generally central frequency region may not be at the center of the host carrier control region and may be wider or narrower than the 72 sub-carriers or 1.08 MHz as used in LTE. Likewise, the sub-frames may be of a different size or sizes.

The low bandwidth UE or legacy full bandwidth UE then decodes the PBCH in 610, which in one example is also carried on the generally central frequency region of the host carrier control region, e.g. the central region 510 of FIG. 5, where the PBCH includes in particular the Master Information Block (MIB). The MIB indicates in particular the bandwidth of the downlink carrier, the most significant bits of the System Frame Number (SFN), and the PHICH configuration. Using the MIB carried on the PBCH, the full or low bandwidth UE may then be made aware of the bandwidth of the carrier. As the low bandwidth UE or legacy full bandwidth UE also knows where the generally central frequency region of the host carrier control region is, the full or low bandwidth UE knows the exact range of subcarriers occupied by the downlink carrier.

For each sub-frame, the legacy full bandwidth UE then decodes the PCFICH, in 615, which is distributed across the entire bandwidth of the carrier. As discussed above, an LTE downlink carrier can be up to 20 MHz wide (1200 subcarriers) and an LTE full bandwidth UE therefore has to have the capability to receive and decode transmissions on a 20 MHz bandwidth in order to decode the PCFICH. At that stage, with a 20 MHz carrier band, the full bandwidth UE operates at a much larger bandwidth than during 605 and 610 relating to synchronization and PBCH decoding.

The full bandwidth UE then establishes the PHICH locations in 620 and decodes the PDCCH in 625, in particular for identifying system information transmissions and for identifying its personal allocation grants. The allocation grants are used by the legacy full bandwidth UE to locate system information and to locate the full bandwidth UE's data in the PDSCH. Both system information and personal allocations are transmitted on PDSCH and can be scheduled anywhere within the bandwidth of the carrier.

At 615 to 625, the legacy full bandwidth UE decodes information contained in the control region, say control region 500 of FIG. 5, of a sub-frame. As explained above, in LTE, the three (PCFICH, PHICH and PDCCH) control channels are located across the control region of the carrier where the control regions extends over the system bandwidth and occupies the first one, two or three orthogonal frequency division multiplex (OFDM) symbols of each sub-frame. In a sub-frame, typically the (PCFICH, PHICH and PDCCH) control channels do not use all the resource elements within the control region, but they are scattered across the entire region, such that a legacy LTE full bandwidth UE has to be able to simultaneously receive the entire control region 500 for decoding each of the three (PCFICH, PHICH and PDCCH) control channels. The legacy full bandwidth UE is then able to decode the PDSCH in 630 that contains system information or data transmitted for this full bandwidth UE.

In contrast, and referring now to a low bandwidth UE operating generally on virtual carriers, the low bandwidth UE's operation changes after 610 to locate the primary virtual carrier as shown in 635. Prior to 635, the low bandwidth UE may determine the location of the primary virtual carrier by decoding the MIB (transmitted on the PBCH) in step 610. The low bandwidth UE camping on the cell to receive data on the virtual carrier decodes the control region 520 on the primary virtual carrier and identifies resource blocks that have been allocated to it or resource blocks carrying system information, in 640. The low bandwidth UE can then decode the PDSCH resource blocks that have been allocated to it or the system information, in 645. The system information may occupy the same resource blocks as the host carrier or may occupy specific resource blocks for the low bandwidth UE. In this manner, the low bandwidth UE receives data transmitted by the eNodeB, with the decoded data including the remainder of the system information containing details of the network configuration.

Figure 7:
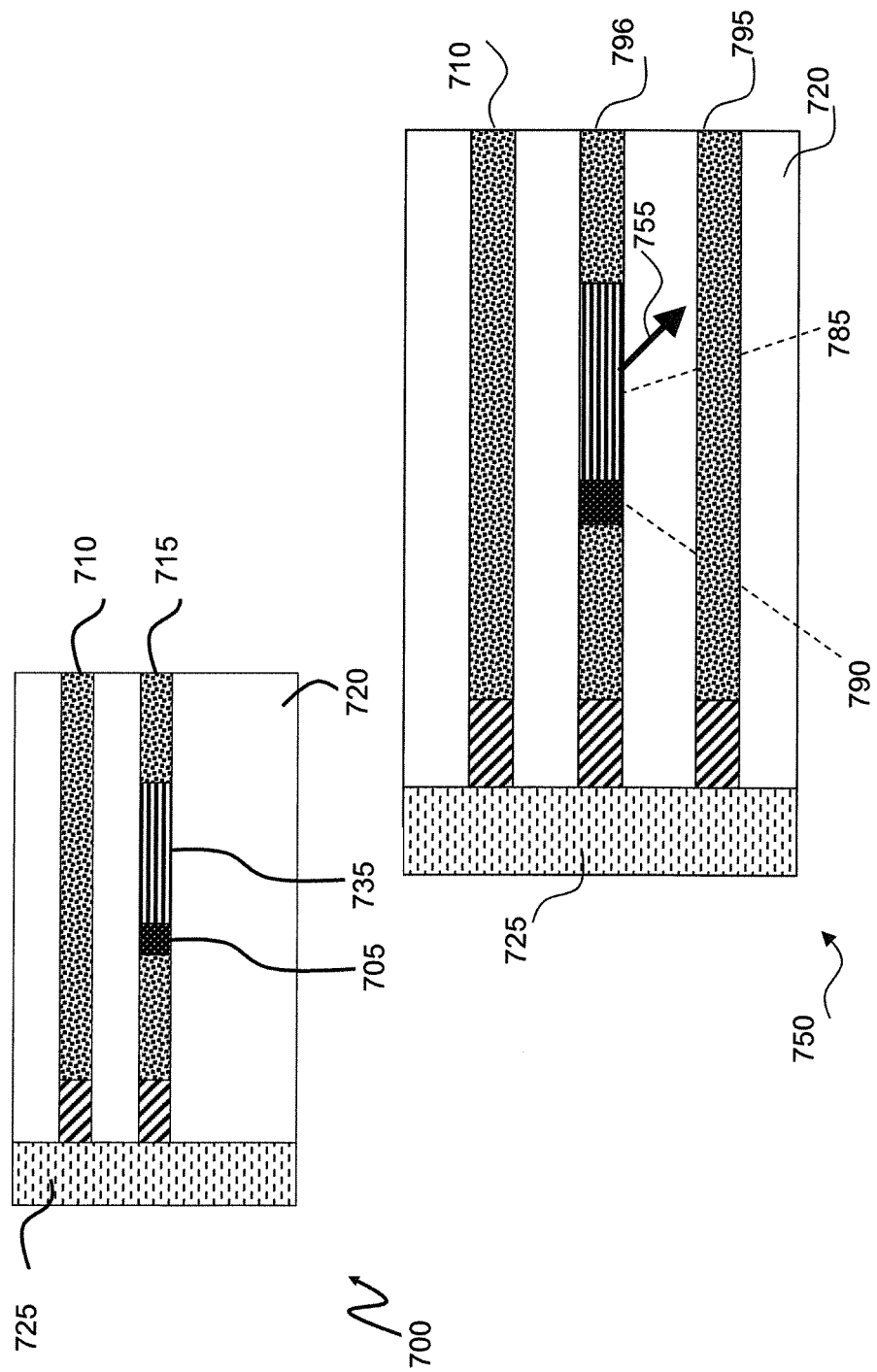
FIG. 7 illustrates a schematic diagram of a plurality of virtual carriers situated within a host carrier according to an example embodiment of the invention.

FIG. 7 illustrates a first schematic diagram 700 of a single sub-frame of a host carrier 720 containing within it a plurality of virtual carriers, according to an example embodiment of the invention. The single sub-frame shown is the first sub-frame of an LTE radio frame, hence this sub-frame contains the PBCH and synchronization signals. This illustrated example 700 comprises, host carrier 720, host carrier control region 725, primary virtual carrier 715 and working virtual carrier 710.

In this example, the primary virtual carrier is the virtual carrier whose location or existence is indicated by the master information block (MIB) of the host carrier. The default virtual carrier is the virtual carrier whose subcarriers substantially overlap with those used by the synchronisation signals. In FIG. 7, the primary virtual carrier 715 acts as a default virtual carrier.

In particular, the example 700 illustrates acquiring synchronization information using synchronization signals that occupy subcarrier resources that overlap with the subcarrier resources occupied by the default virtual carrier, in order to allow a UE, such as a low bandwidth UE, to re-synchronize with the wireless communication system.

In this illustrated example, the primary virtual carrier 715 is assigned to a central frequency band of the host carrier 720. In this example embodiment, the primary virtual carrier 715 is arranged to function as a default virtual carrier. As illustrated, within the physical resources occupied by the default virtual carrier, the primary and secondary synchronization signals (PSS, SSS) 705 and PBCH 735 are contained.

In this manner, when a low bandwidth UE initially connects to a virtual carrier, it is assigned to the primary virtual carrier 715, in order to obtain synchronization with the network by reception and processing of the synchronization signals 705 and the PBCH 735.

In some examples, when paging messages for the low bandwidth UE are sent via the PBCH 735 on the default virtual carrier, the low bandwidth UE may then be assigned to another virtual carrier within the host carrier 720 which, in this example embodiment, is the working virtual carrier 710. The low bandwidth UE then switches over to the working virtual carrier 710 following being paged.

The low bandwidth UE assigned to the working virtual carrier 710 is able to maintain synchronization by tracking reference symbols that are contained within the subcarriers that the working virtual carrier 710 occupies. For example the UE may maintain a clock that it synchronizes to the timing of the network using the reference symbols: by measuring the phase of the received reference symbols and comparing that phase to its internal clock, it can advance or retard that clock appropriately, thereby synchronizing its clock to the timing of the network.

In known virtual carrier scenarios, when the low bandwidth UE is 'camped' on the working virtual carrier 710 and then initiates a DRX cycle and 'falls asleep' to conserve power, the low bandwidth UE 'awakes' from its DRX cycle still camped on the working virtual carrier 710. Therefore, the low bandwidth UE would typically have to scan and re-connect with the synchronization signals 705 and PBCH 735 in the central subcarriers of the host carrier (where the primary virtual carrier 715 also occupies those central subcarriers) in order to re-synchronize to the network, prior to decoding the working virtual carrier 715.

In this example embodiment, the low bandwidth UE, which has been assigned to the working virtual carrier 710, enters a DRX cycle on the working virtual carrier 710, but 'awakes' on the primary virtual carrier 715 (rather than the working virtual carrier that it fell asleep on), in order to access the PSS and SSS synchronization signals 705 and re-synchronize with the network. The low bandwidth UE knows a-priori the characteristics of the primary virtual carrier 715 from the time it was initially assigned to it, and stores this information for subsequent use, say in memory 316 of FIG. 2.

In this example embodiment, the primary virtual carrier is always located in a fixed position within the host carrier. In this example embodiment the fixed position of the primary virtual carrier overlaps the central band of the host carrier 720. However, in other example embodiments the fixed position of the primary virtual carrier 715 may be anywhere within the bandwidth of the host carrier 720.

In accordance with example embodiments of the invention, after awaking sufficient circuits/components, the low bandwidth UE is configured to listen for a paging signal on the default virtual carrier, which in the example of FIG. 7 is the same as the primary virtual carrier 715, determine from the paging signal whether there is information assigned for the low bandwidth UE, and if there is information assigned for the low bandwidth UE, the low bandwidth UE fully wakes up from its DRX state and re-tunes to the working virtual carrier (by changing the operating frequency of its RF oscillators, changing filter center frequencies and synchronizing to the reference symbols of the working virtual carrier). Thereafter, until the UE re-enters the 'sleep' phase of its DRX cycle, the low bandwidth UE will achieve sufficient synchronization when operating on the working virtual carrier 710 using reference symbols that are contained within the sub-carriers used on the working virtual carrier 710. By waking on the primary virtual carrier and only re-tuning to the working virtual carrier if paging messages indicate that it should do so, the UE uses fewer processing resources and conserves power (since the UE does not need to perform additional processing and consume extra power to transfer between virtual carriers).

In one example, if there is no paging signal for the low bandwidth UE carried on the primary virtual carrier 715, the low bandwidth UE may re-enter the 'sleep' phase of its DRX state.

For legacy UEs utilising the 3GPP™ standard, UEs wake from the "sleep" phase of the DRX state on the host carrier and, if they are paged on the host carrier, decode the host carrier without re-tuning and re-synchronizing to another carrier.

When the network wishes to page a low bandwidth UE, the MME sends an S1AP (S1 interface application protocol) paging message to the eNode B that the low bandwidth UE is camped onto (or in general to the set of eNodeBs that the UE could be attached to, for example when the UE could roam from one eNodeB to another one). The eNodeB then pages the UE on the primary virtual carrier (e.g. using the PDCCH/PDSCH paging scheme discussed above).

In utilising this approach of having a default/primary virtual carrier that occupies subcarriers that overlap with the synchronization signals PSS and SSS 705 and with the PBCH 735, the low bandwidth UEs are able to conserve power. The primary virtual carrier 715 supports a greater number of low bandwidth UEs for paging purposes, but it does not support a greater number of UEs from the perspective of data transmission since UEs waking up from a DRX state on the primary virtual carrier 715 are automatically transferred (if needed) to a different (working) virtual carrier, for example working virtual carrier 710.

Throughout the description and the claims, the terms 'primary virtual carrier' and 'default virtual carrier' are used interchangeably. However, FIG. 7 also illustrates a second alternative schematic diagram 750 of a single sub-frame of a host carrier 720 containing within it a plurality of virtual carriers, according to an example embodiment of the invention. The single sub-frame shown is the first sub-frame of an LTE radio frame, hence this sub-frame contains the PBCH 785 and synchronization signals 790. This illustrated example 750 comprises, host carrier 720, host carrier control region 725, primary virtual carrier 795, default virtual carrier 796 and working virtual carrier 710. In this second alternative schematic diagram 750, the primary virtual carrier 795 is the virtual carrier that is indicated within the MIB on the PBCH (as represented by arrow 755). The default virtual carrier 796 is the virtual carrier that occupies a set of subcarriers that substantially overlap with those subcarriers used to transmit the synchronisation signals (PSS and SSS 790).

Thus, in this example, the primary virtual carrier 795 may be different to the default virtual carrier 796, for example where the primary virtual carrier 795 is to be used mainly for transmitting system information and to control a connection of UEs to other virtual carriers. In one example, the default virtual carrier 796 may be configured to be able to handle paging signalling (for example associated with UEs coming out of DRX mode). Hence, in order to have sufficient physical resource to transmit large amounts of control signalling (on the primary virtual carrier 795) and large amounts of paging signalling (on the default virtual carrier 796), separate primary 795 and default 796 virtual carriers may be employed in the second alternative schematic diagram 750.

Figure 8:
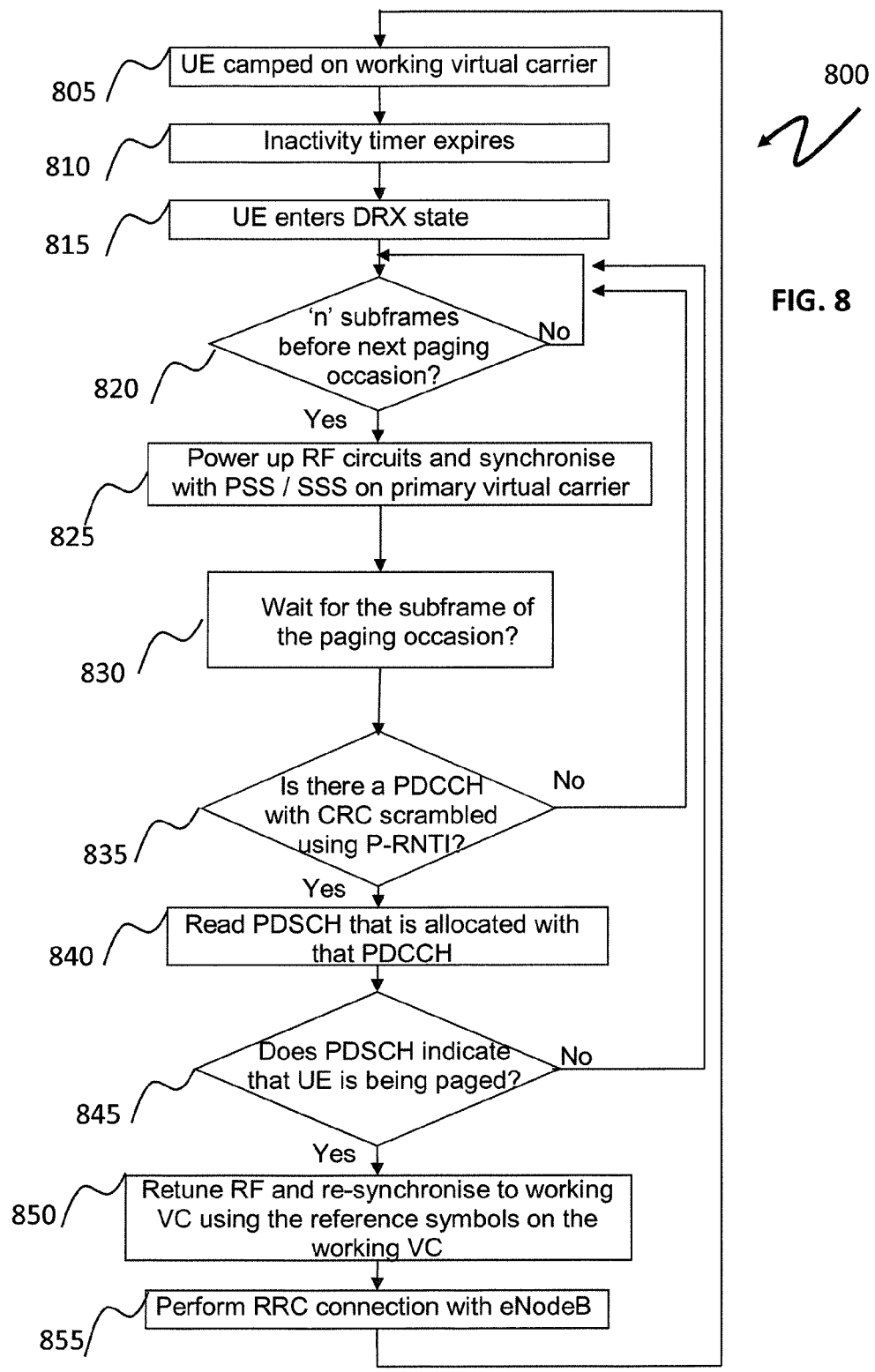
FIG. 8 illustrates a flow chart of UE operation when it enters and exits DRX state according to an example embodiment of the invention.

Referring now to FIG. 8, a flow chart 800 illustrates an example process of a low bandwidth UE entering and leaving a dis-continuous receive (DRX) state, according to an example embodiment of this invention. Initially, the low bandwidth UE is camped on a working virtual carrier, as shown in 805. After the expiry of, say, an inactivity timer in 810, the low bandwidth UE enters a DRX state, as shown in 815. When the low bandwidth UE is in the DRX state in 815, it enters a low power or sleep mode on a first virtual carrier. In one example the UE may power down its radio frequency (RF) circuits and may awaken using a low accuracy (and hence less power consuming) clock and receiver. Notably, in accordance with one example, when waking up from the low power/sleep mode of operation, the low bandwidth UE is configured to wake up on a default virtual carrier that is not the first virtual carrier.

In this example embodiment, the low bandwidth UE determines a number 'n' of sub-frames before its next paging occasion, as shown in 820. The paging occasion for a UE is determined based on a 3GPP-specified equation that includes parameters such as the UE's International Mobile Subscriber Identity (IMSI), the DRX cycle length (as signalled on SIB), etc. The UE determines the number 'n' of sub-frames before the paging occasion based on its knowledge of the time it requires to power up its receiver circuits (possibly including its RF, clock/frequency generation circuits and baseband circuits) prior to being able to receive LTE signals. The low bandwidth UE then powers up its RF and clock/frequency generation circuits and baseband circuits in 825. Notably, the low bandwidth UE 'wakes-up' on the primary virtual carrier, as shown in 825. The low bandwidth UE synchronizes with the network once it has acquired the primary synchronization signal (PSS) and the secondary synchronization signal (SSS). The low bandwidth UE acquires synchronization information using, for example PSS and SSS synchronization signals, which occupy subcarrier resources that overlap with the sub-carrier resources occupied by the default virtual carrier, in order to re-synchronize with the wireless communication system.

Initiating the power up 'n' sub-frames before the paging occasion allows the low bandwidth UE to stabilise its oscillators and achieve re-synchronization with the network (using the PSS and SSS on the primary virtual carrier) before the paging occasion occurs. The UE may also read the contents of the PBCH. In 830, the UE then waits for the appropriate sub-frame of the paging occasion. The low bandwidth UE then determines whether there is a physical downlink control channel (PDCCH) with a cyclic redundancy check (CRC) scrambled using a paging-radio network temporary Identifier (P-RNTI), as shown in 835. If there is such a PDCCH in 835, then the low bandwidth UE reads the physical downlink shared channel (PDSCH) that is allocated with the (PDCCH), as shown in 840. The low bandwidth UE then determines if the PDSCH indicates that the UE is being paged, in 845. If the low bandwidth UE determines that it is being paged in 845, then the low bandwidth UE re-tunes and re-synchronizes to the working virtual carrier using the reference symbols on the working virtual carrier, as shown in 850. In one example, the low bandwidth UE may know a-priori the characteristics of the working virtual carrier, from the time that it was initially assigned to the working virtual carrier, and in such a scenario the low bandwidth UE does not need to re-read the system information that may be carried on the working virtual carrier.

After the low bandwidth UE has re-tuned to the working virtual carrier, it performs a radio resource control connection with the eNodeB 855 and the re-tuning operation completes with the low bandwidth UE being camped on the working virtual carrier in 805.

In one example, one of the first virtual carrier and the default virtual carrier is located within a host carrier. In another example, both the first virtual carrier and the default virtual carrier are located within a host carrier.

Figure 9:
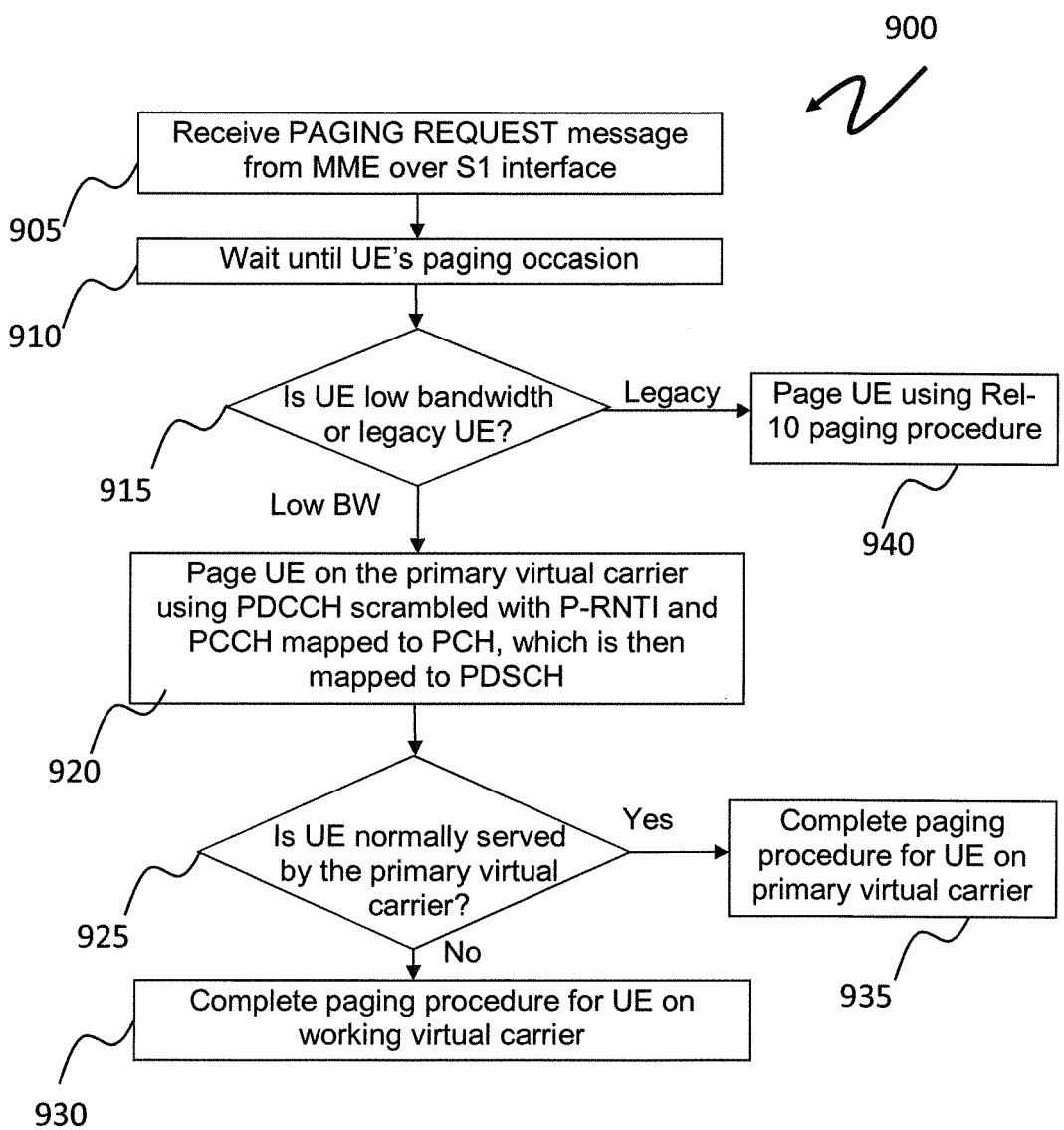
FIG. 9 illustrates a base station (eNodeB) operation according to an example embodiment of the invention.

FIG. 9 illustrates a flow chart 900 of the operation of an eNodeB according to an example embodiment of the invention. Initially, the eNodeB may receive a paging request message from, say, a mobility management entity MME over, say, the S1 interface, as illustrated in 905. In this example embodiment, it is the MME that decides to page the UE, whereas the eNodeB is the entity that selects the method by which the UE is paged. After receiving the paging request for the UE from the MME, the eNodeB waits until the paging occasion to page the desired UE, as shown in 910. In 915, the eNodeB then determines whether the UE to be paged is a legacy or a low bandwidth UE. If the UE to be paged is a legacy device, as determined in 915, the eNodeB pages the legacy UE using, say, a Release-10 paging procedure, as illustrated in 940. If the UE is a low bandwidth device, as determined in 915, the eNodeB pages the low bandwidth UE on the primary virtual carrier, using say the paging control channel (PCCH) mapped to the paging channel (PCH) which is then mapped to the physical downlink shared channel (PDSCH) and allocated using a physical downlink control channel (PDCCH) scrambled with a paging-radio network temporary identifier (P-RNTI) as shown in 920.

The eNodeB then determines whether the low bandwidth UE is usually served by the primary virtual carrier, or a working virtual carrier within the host bandwidth, as shown in 925. If the eNodeB determines that the low bandwidth UE is usually served by the primary virtual carrier in 925, then the eNodeB completes the paging procedure on the primary virtual carrier, as illustrated in 935. However, if the eNodeB determines that the low bandwidth UE is usually served by a working virtual carrier in 925, then the eNodeB completes the paging procedure on the relevant working virtual carrier as illustrated in 930.

In an example embodiment of the invention, the eNodeB may page the UE both on the default virtual carrier, for example according to the flow chart 900, and on the working virtual carrier. In this way, if the UE has not lost synchronization, it will decode the paging message on the working virtual carrier and if it has lost synchronization, it will decode the paging message on the default virtual carrier and then complete the paging procedure on the working virtual carrier. By paging the UE on both virtual carriers, the eNodeB does not need to be informed of which virtual carrier the UE is going to wake from its sleep phase on.

Although examples have been described showing the virtual carrier being located in a central position within the host bandwidth, it is envisaged that in another example embodiment, the primary virtual carrier may be located in a fixed position anywhere within the host bandwidth, which may or may not overlap with the central band of the host carrier.

It will be appreciated that, for clarity purposes, the above description has described embodiments of the invention with reference to different functional units and processors. However, it will be apparent that any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to re-synchronize a wireless communication unit to a wireless communication system employing one or more virtual carrier (s) after the wireless communication unit has lost synchronization. The executable program code may be operable for, when executed at the wireless communication unit or the base station, performing any of the aforementioned methods. Thus, the elements and components of an embodiment of the invention may be physically, functionally and logically implemented in any suitable way. Indeed, the functionality may be implemented in a single unit, in a plurality of units or as part of other functional units.

Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality. For example, for clarity the control processor 296 and signal processing logic 308 have been illustrated and described as a single processing module, whereas in other implementations they may comprise separate processing modules or logic blocks.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A method for a low bandwidth wireless communication unit to re-synchronize to a wireless communication system employing one or more virtual carrier(s) after the wireless communication unit has lost synchronization, where the one or more virtual carrier(s) do not occupy symbols that are used by a host carrier to transmit a host carrier's control channels, the method comprising, at the wireless communication unit:
   entering a sleep mode of operation comprising a discontinuous receive mode of operation following communication on a first virtual carrier;
   waking up from the sleep mode of operation on a default virtual carrier that is not the first virtual carrier;
   acquiring synchronization information using synchronization signals that occupy subcarrier resources that overlap with the subcarrier resources occupied by the default virtual carrier to re-synchronize with the wireless communication system; and
   re-tuning to the first virtual carrier or a second virtual carrier.

2. The method of claim 1 further comprising receiving a paging signal on the default virtual carrier and re-tuning to the first virtual carrier or the second virtual carrier in response thereto.

3. The method of claim 2 further comprising additionally receiving a paging signal on the first virtual carrier.

4. The method of claim 2 further comprising returning to a sleep mode of operation on the default virtual carrier if no paging signal for the wireless communication unit is received.

5. The method of claim 1 wherein at least one of the first virtual carrier and the default virtual carrier is located within a host carrier.

6. The method of claim 5 wherein the default virtual carrier is centrally located in a frequency band of the host carrier.

7. The method of claim 1 wherein the synchronization information comprises at least one of a primary synchronization signal or a secondary synchronization signal.

8. The method of claim 1 further comprising determining a time period of sleep mode operation and in response to the determined time period exceeding a threshold waking up from the sleep mode of operation on the default virtual carrier that is not the first virtual carrier.

9. The method of claim 8 wherein the time period threshold equates to a time period such that the wireless communication unit synchronizes using reference symbols and synchronisation signals.

10. The method of claim 1 wherein entering a sleep mode of operation comprises entering a discontinuous receive (DRX) mode of operation.

11. A non-transitory computer program product comprising executable program code to re-synchronize a wireless communication unit to a wireless communication system employing one or more virtual carrier(s) after the wireless communication unit has lost synchronization, where the one or more virtual carrier(s) do not occupy symbols that are used by a host carrier to transmit a host carrier's control channels, the executable program code operable for, when executed at the wireless communication unit:
   entering a sleep mode of operation comprising a discontinuous receive mode of operation following communication on a first virtual carrier;
   waking up from the sleep mode of operation on a default virtual carrier that is not the first virtual carrier;
   acquiring synchronization information using synchronization signals that occupy subcarrier resources that overlap with the subcarrier resources occupied by the default virtual carrier to re-synchronize with the wireless communication system; and
   re-tuning to the first virtual carrier or a second virtual carrier.

12. A low bandwidth wireless communication unit comprising:
   a control processor arranged to enter a sleep mode of operation comprising a discontinuous receive mode of operation following communication on a first virtual carrier of a wireless communication system employing one or more virtual carrier(s) where the one or more virtual carrier(s) do not occupy symbols that are used by a host carrier to transmit a host carrier's control channels; and
   a receiver operably coupled to the control processor and arranged to wake up the low bandwidth wireless communication unit from the sleep mode of operation on a default virtual carrier that is not the first virtual carrier,
   wherein the control processor is further arranged to acquire synchronization information using synchronization signals that occupy subcarrier resources that overlap with the subcarrier resources occupied by the default virtual carrier to re-synchronize with the wireless communication system; and re-tune to the first virtual carrier or a second virtual carrier.

13. An integrated circuit for a low bandwidth wireless communication unit comprising:
   a control processor arranged to enter a sleep mode of operation comprising a discontinuous receive mode of operation following communication on a first virtual carrier of a wireless communication system employing one or more virtual carrier(s) and wake up the low bandwidth wireless communication unit from the sleep mode of operation on a default virtual carrier that is not the first virtual carrier, where the one or more virtual carrier(s) do not occupy symbols that are used by a host carrier to transmit a host carrier's control channels, wherein the control processor is further arranged to acquire synchronization information using synchronization signals that occupy subcarrier resources that overlap with the subcarrier resources occupied by the default virtual carrier to re-synchronize with the wireless communication system; and re-tune to the first virtual carrier or a second virtual carrier.

14. A method for a base station supporting a low bandwidth wireless communication unit in a wireless communication system employing one or more virtual carrier(s), where the one or more virtual carrier(s) do not occupy symbols that are used by a host carrier to transmit a host carrier's control channels, the method comprising, at the base station:
   receiving a paging request for a wireless communication unit;
   determining whether the paging request relates to a low bandwidth wireless communication unit that is in a sleep mode comprising a discontinuous receive mode of operation; and
   paging the low bandwidth wireless communication unit on a default virtual carrier that is not a virtual carrier on which the low bandwidth wireless communication unit entered the sleep mode.

15. The method of claim 14 further comprising additionally paging the low bandwidth wireless communication unit on the first virtual carrier.

16. The method of claim 14 wherein at least one of the first virtual carrier and the default virtual carrier is located within a host carrier.

17. The method of claim 16 wherein the default virtual carrier is centrally located in a frequency band of the host carrier.

18. A base station for supporting a low bandwidth wireless communication unit in a wireless communication system employing one or more virtual carrier(s), where the one or more virtual carrier(s) do not occupy symbols that are used by a host carrier to transmit a host carrier's control channels, the base station comprising:
- a receiver arranged to receive a paging request for a wireless communication unit;
- a control processor arranged to determine whether the paging request relates to a low bandwidth wireless communication unit that is in a sleep mode comprising a discontinuous receive mode of operation; and
- a transmitter arranged to page the low bandwidth wireless communication unit on a default virtual carrier that is not a virtual carrier on which the low bandwidth wireless communication unit entered the sleep mode.

19. An integrated circuit for a base station for supporting a low bandwidth wireless communication unit in a wireless communication system employing one or more virtual carrier(s), where the one or more virtual carrier(s) do not occupy symbols that are used by a host carrier to transmit a host carrier's control channels, the integrated circuit comprising:
- a control processor arranged to receive a paging request for a wireless communication unit and determine whether the paging request relates to a low bandwidth wireless communication unit that is in a sleep mode comprising a discontinuous receive mode of operation;
- wherein the control processor is further arranged to page the low bandwidth wireless communication unit on a default virtual carrier that is not a virtual carrier on which the low bandwidth wireless communication unit entered the sleep mode.

20. A non-transitory computer program product comprising executable program code for supporting a low bandwidth wireless communication unit in a wireless communication system employing one or more virtual carrier(s), where the one or more virtual carrier(s) do not occupy symbols that are used by a host carrier to transmit a host carrier's control channels, the executable program code operable for, when executed at a base station:
- receiving a paging request for a wireless communication unit;
- determining whether the paging request relates to a low bandwidth wireless communication unit that is in a sleep mode comprising a discontinuous receive mode of operation; and
- paging the low bandwidth wireless communication unit on a default virtual carrier that is not a virtual carrier on which the low bandwidth wireless communication unit entered the sleep mode.

* * * * *

UNITED STATES PATENT AND TRADEMARK OFFICE
CERTIFICATE OF CORRECTION

| | | |
|---|---|---|
| PATENT NO. | : 9,084,189 B2 | |
| APPLICATION NO. | : 13/678804 | |
| DATED | : July 14, 2015 | |
| INVENTOR(S) | : Martin Warwick Beale | |

It is certified that error appears in the above-identified patent and that said Letters Patent is hereby corrected as shown below:

TITLE PAGE:

Item (71) Applicant: Change "San Francsico" to -- San Francisco --.

Signed and Sealed this
Fifteenth Day of December, 2015

Michelle K. Lee
*Director of the United States Patent and Trademark Office*